United States Patent
Shen et al.

(10) Patent No.: US 7,966,959 B1
(45) Date of Patent: Jun. 28, 2011

(54) PERMEABLE HULL TO MITIGATE IMPACT LOAD IN WATER

(75) Inventors: Young T. Shen, Potomac, MD (US);
Scott Gowing, North Potomac, MD (US); William G. Day, Salisbury, MD (US); Timothy W. Coats, Yorktown, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 411 days.

(21) Appl. No.: 12/148,074

(22) Filed: Apr. 15, 2008

(51) Int. Cl.
*B63B 1/00* (2006.01)
*B63B 1/32* (2006.01)
*B63B 1/40* (2006.01)
*B63B 39/00* (2006.01)
*B63B 39/10* (2006.01)

(52) U.S. Cl. ............... 114/121; 114/61.32; 114/122; 114/125; 114/288

(58) Field of Classification Search ............... 114/56.1, 114/61.32, 61.33, 62, 65 R, 67 A, 121, 122, 114/125, 183 R, 197, 271, 279, 283–289
See application file for complete search history.

(56) References Cited

U.S. PATENT DOCUMENTS

| | | | | |
|---|---|---|---|---|
| 1,552,065 A * | 9/1925 | Larner | ................ | 114/125 |
| 1,697,257 A * | 1/1929 | Anissimoff | ................ | 114/67 A |
| 1,840,185 A * | 1/1932 | Cable | ................ | 114/67 A |
| 1,875,629 A * | 9/1932 | Marconnet | ................ | 114/67 A |
| 1,894,256 A * | 1/1933 | de Ganahl et al. | ........ | 114/67 A |
| 3,776,168 A | 12/1973 | Weeks | | |
| 4,535,712 A * | 8/1985 | Matthews | ................ | 114/67 A |
| 6,880,477 B2 * | 4/2005 | Royle | ................ | 114/67 R |

FOREIGN PATENT DOCUMENTS

| JP | 10109684 A | * | 4/1998 |
| JP | 2002002584 A | * | 1/2002 |
| JP | 2004359012 A | * | 12/2004 |
| JP | 2006176068 A | * | 7/2006 |

* cited by examiner

*Primary Examiner* — Ajay Vasudeva
(74) *Attorney, Agent, or Firm* — Dave A. Ghatt

(57) ABSTRACT

The invention is directed to an apparatus for mitigating the load impact on a surface watercraft and passengers therein, during high speed travel. The hull includes a damping cavity for mitigating the load impact on the surface watercraft. The damping cavity is positioned on a dry portion of an undersurface of the hull between a forward end and an aft end of the hull. The damping cavity includes a porous plate on the undersurface, and a deck plate within the hull body. The deck plate and the porous plate are separated by a gap, and an inflatable bladder may be positioned in the gap between the plates.

19 Claims, 3 Drawing Sheets

PERMEABLE HULL TO MITIGATE IMPACT LOAD IN WATER

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to an apparatus for damping the wave slamming on a surface watercraft, and in particular, a surface watercraft hull having a porous portion within a section of the undersurface of the hull for dissipating wave impacts during high speed travel.

BACKGROUND

U.S. forces use small, high-speed boats for military purposes in coastal areas. These boats are typically about 30-70 feet long, and operate in a planning mode around 40 to 50 knots. Boats of similar size and mechanical specifications may also be used in the private sector for non-military purposes such as recreation. However, because of the size of the boats and the speed at which they travel, these craft experience high shock acceleration levels when traveling through waves, which results in injuries to passengers. Passengers may experience repetitive trauma resulting in acute injury to the lower back, knees, and neck.

At high sea states, craft accelerations in excess of 7 to 10 g's have been reported. Laboratory tests of slamming ship models show acceleration levels from 4 to 6 g's. It is therefore desired to reduce shock levels that these boats and their passengers experience. It is furthermore desired to incorporate a shock damping arrangement into the boat design.

SUMMARY

In one aspect, the invention is a surface watercraft having a hull. The hull has an upper portion, a lower portion, a forward end, and an aft end. The hull further includes a shock damping cavity in the lower portion between the forward end and the aft end. The damping cavity has a non-planar porous plate having a first edge and a second edge. The damping cavity also includes a deck plate having a first edge and a second edge. According to invention, the first edge of the deck plate is attached to the first edge of the non-planar porous plate, and the second edge of the deck plate is attached to the second edge of the non-planar porous plate, thereby forming a cavity enclosure.

In another aspect, the invention is a shock mitigating high speed surface watercraft. The high speed surface watercraft includes a hull having an exposed undersurface. The exposed undersurface has a wet region extending from an aft end of the hull defining the region of the hull that supports the watercraft when the high speed watercraft is traveling in at planning mode velocity. The exposed undersurface further includes a dry region extending from a forward end of the hull towards the wet region defining the region of the hull that is above a water level when the high speed watercraft is traveling at the planning mode velocity. In this aspect, the high speed surface watercraft further includes a damping cavity. The damping cavity has a non-planar porous plate forming a part of the exposed undersurface, positioned in the dry region of the exposed undersurface. The non-planar porous plate has a first longitudinal edge and a second longitudinal edge. The surface watercraft further includes a deck plate within the hull having a first longitudinal edge and a second longitudinal edge. In this aspect, the first longitudinal edge of the deck plate is attached to the first longitudinal edge of the non-planar porous plate and the second longitudinal edge of the deck plate is attached to the second longitudinal edge of the non-planar porous plate, thereby forming a cavity enclosure within the hull.

BRIEF DESCRIPTION OF THE DRAWINGS

Other features will be apparent from the description, the drawings, and the claims.

DETAILED DESCRIPTION

Figure 1:
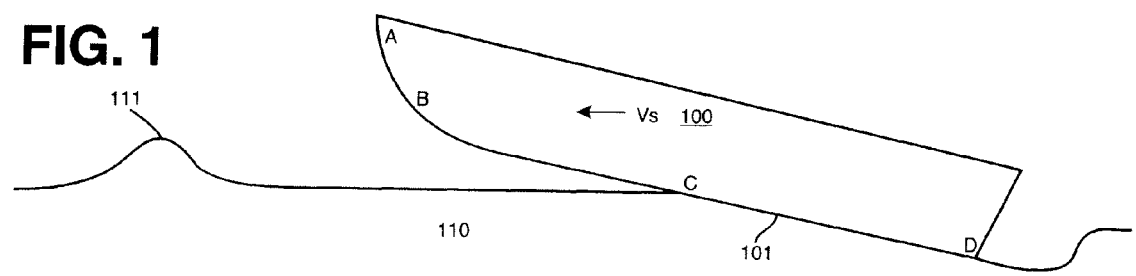
FIG. 1 is an explanatory illustration of a surface watercraft in planning mode, according to an embodiment of the invention.

FIG. 1 is an explanatory illustration of a surface watercraft 100 in planning mode, according to an embodiment of the invention. As shown, the surface watercraft 100, having an undersurface 101 is traveling at a velocity Vs. The velocity Vs is the planning mode velocity and may typically be about 35 knots to about 55 knots. In some applications, velocity Vs may also be a velocity outside the above cited range. FIG. 1 shows the orientation of the watercraft 100 on the water surface 110, with C denoting the contact point of the water and the undersurface 101 when operated in calm water. CD denotes the wetted portion of the undersurface 101, which supports the surface watercraft 100 in planning motion. The front portion of the hull, which includes the dry portion ABC of the undersurface 101, is above the water surface 110.

In the arrangement of FIG. 1, slamming occurs when a forward portion BC of the undersurface 101 contacts a wave 111. The forward portion BC is located within the dry portion ABC. As will be outlined below, the shock load on the watercraft 100 is reduced by including a perforated, permeable, or irregular surface in the underside 101 in the forward portion BC.

Figure 2A:
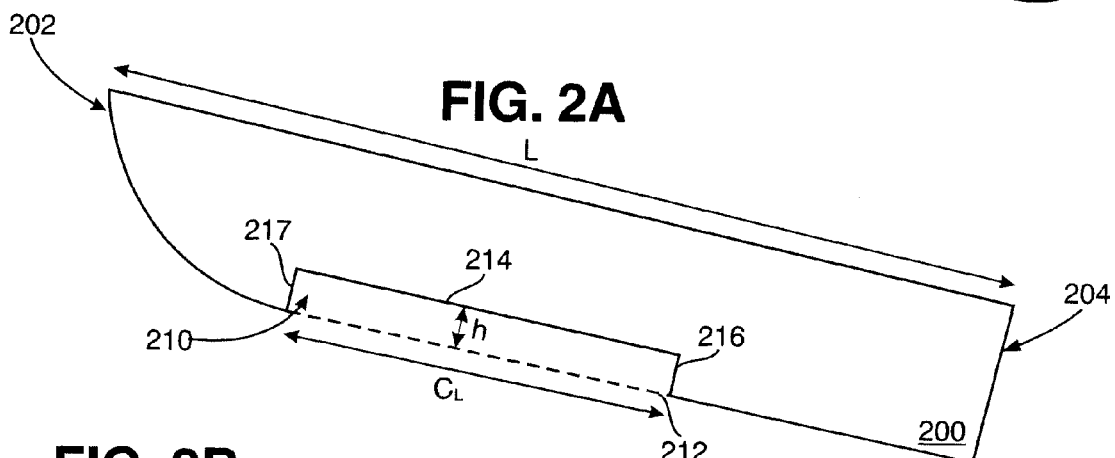
FIG. 2A is an exemplary side view illustration of a surface watercraft including a damping cavity, according to an embodiment of the invention.
Figure 2B:
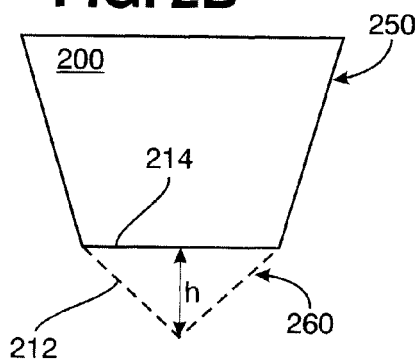
FIG. 2B is an exemplary front view illustration of a surface watercraft including a damping cavity, according to an embodiment of the invention.

FIG. 2A is an exemplary side view illustration of a surface watercraft hull 200 including a damping cavity 210, according to an embodiment of the invention. The damping cavity 210, provided to mitigate shock, is positioned in a dry area of undersurface 201 equivalent to BC of FIG. 1. Dry portion areas and the wet portion areas of the undersurface 201 are determined when the watercraft is traveling in planning mode, which is typically at speeds of about 35 knots to about 55 knots. In some applications the planning mode velocities may be outside the above outlined range. As shown, the damping cavity 210 is located between the forward end 202 and the aft end 204 of the hull 200. The location of the damping cavity 210 corresponds to the dry area on the watercraft hull 200 that is struck by waves. The damping cavity 210 includes a porous plate 212 forming a continuous part of the undersurface 201 of the watercraft 200. Thus, the damping cavity 210 forms a porous portion of the hull undersurface 201, with all other portions of the undersurface 201 being non-porous. Thus, the porous portion is located between a non-porous forward portion and a non-porous aft portion FIG. 2B is an exemplary front view illustration of the surface watercraft 200, also showing the damping cavity 210. FIG. 2B shows hull 200 having an upper hull body 250 and a lower hull body 260. The damping cavity 210 is located in the lower hull body 260. FIG. 2B view shows the porous plate 212 being non-planer, and having a substantially V-shaped cross section. The shape of the porous plate is preferably commensurate with the overall shape of the undersurface 201, but may also have planar or non-planer profiles. The porous plate 212 may also be embedded in the lower part of a hull shape that does not have separate upper and lower hull portions, but has instead a continuous profile.

Figure 2C:
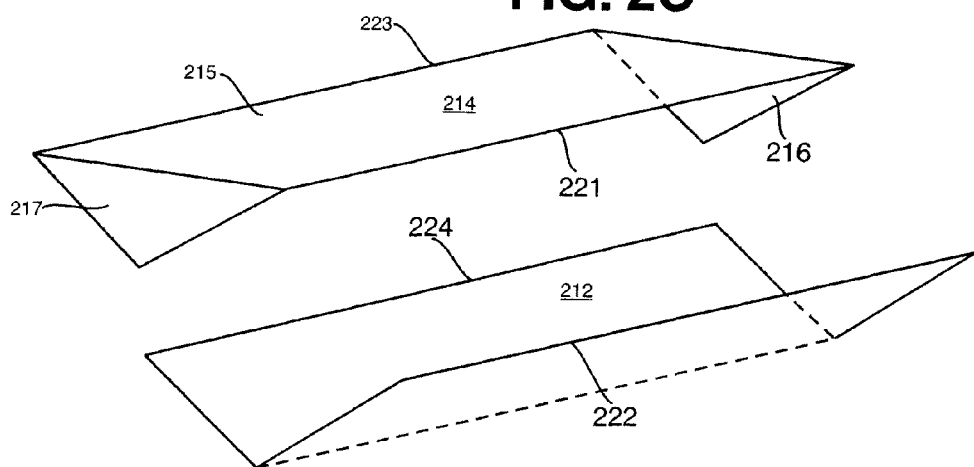
FIG. 2C is an exploded view of a damping cavity according to an embodiment of the invention.

FIGS. 2A and 2B further show the damping cavity 210 having a deck plate 214 and end plates 216 and 217, which together form a cavity enclosure with the porous plate 212. FIG. 2C shows an exploded view of the arrangement of the porous plate 212, the deck plate 214, and end plates 216 and 217. The deck plate 214 and end plates 216 and 217 are watertight and preserve buoyancy and maintain the watertight integrity of the watercraft hull 200. The porous plate 212 is attached to the deck plate 214 and to the endplates 216 and 217 along mating edges A first edge 221 of the deck plate 214 is attached to a first edge 222 of the porous plate 212, and a second edge 223 of the deck plate 214 is attached to a second edge 224 of the porous plate 214. When the plates 212, 214, 216 and 217 are joined, a cavity enclosure is formed within the hull.

Returning to FIGS. 2A and 2B, as shown, the surface watercraft 200 has a height h between the porous plate 212 and the deck plate 214. The height h may typically be about 3 inches to about 4 inches. However, in some applications the height h may be less than 3 inches or may be greater than 4 inches. FIG. 2A also shows the hull 200 having a length L, which may be about 30 feet to about 70 feet long. In some applications the length L may be less than 30 feet or more than 70 feet. Larger L values typically require large h values. Additionally, the damping cavity has a length $C_L$, which is typically, but not limited to, about 20% to about 45% of the length L.

As shown in FIGS. 2B and 2C, the porous plate 214 is non-planer and has a substantially V-shaped cross section, thereby forming a cavity enclosure having a substantially triangular cross section, with end plates 216 and 217 also having a substantially triangular cross section. However, as stated above, the non-planer shape of the porous plate 214 is preferably commensurate with the overall shape of the undersurface 201 of the hull 200. Thus, depending on the shape of the undersurface, the porous plate may have other non-planar sections, such as arc-like or U-shaped sections. Alternatively, the plate 214 may be planar, thereby having a flat section. It should be noted that end plates 216 and 217 have shapes that match the sectional shape of the porous plate 212. The porous plate 212 may be made from aluminum or fiberglass and the like, and the deck plate 214 may be made from materials similar to that of the remainder of the hull.

Figure 3A:
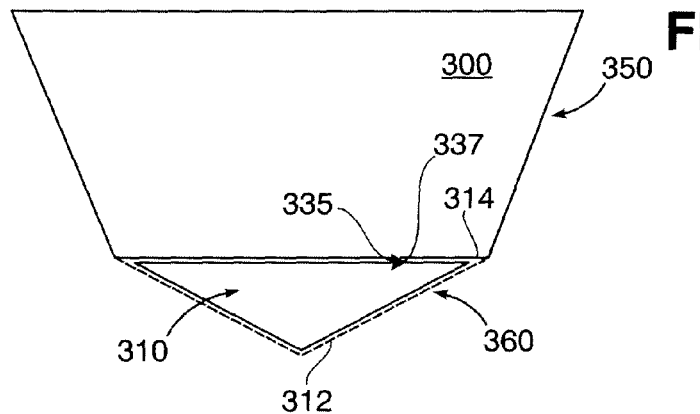
FIG. 3A is an exemplary front view illustration of a surface watercraft including a damping cavity, according to an embodiment of the invention.

FIG. 3A is an exemplary front view illustration of a surface watercraft hull 300 having a damping cavity 310, according to an embodiment of the invention. FIG. 3A shows the hull having an upper hull body 350 and a lower hull body 360, with the damping cavity 310 located in the lower hull body 360. The damping cavity 310, which includes a porous plate 312 and a deck plate 314, is similar to the damping cavity of FIGS. 2A and 2B. However, damping cavity 310 includes an additional element, i.e., a bladder 330 within the cavity enclosure 325, occupying the space between the porous plate 312 and the deck plate 314.

As shown in FIG. 3A, the bladder 330 includes an air tube 335 that extends through a bladder hole 337 in the deck plate 314. The bladder hole 337 is dimensioned so that there is a water tight seal between the bladder hole 337 and the air tube 335, thereby preventing the leakage of water from the lower body 360 into the upper body 350. The air tube 335 is provided to fill the bladder 330 with air or other gases to inflate the bladder and make its shape conform to the interior dimensions of cavity 310. Inflating the bladder 330 increases the buoyancy lost in the damping cavity 310 by displacing the water. The bladder 330 may also provide additional energy absorption to mitigate shock load. The gas pressure in the bladder may be varied over a range of values for optimal shock load damping. Additionally, the bladder may be pressurized to effectively seal off the holes of the porous plate and return it to a relatively smooth condition and eliminate any additional drag the holes may cause when the surface is calm and the porous section is not needed. Although FIG. 3A illustrates a single bladder 330, the single bladder may be replaced by a plurality of bladders within the cavity enclosure.

Figure 3B:
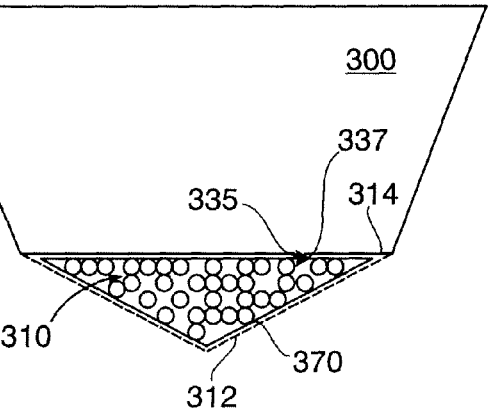
FIG. 3B is an exemplary front view illustration of a surface watercraft including a damping cavity, according to an embodiment of the invention.

FIG. 3B is an exemplary front view illustration of a surface watercraft 300, including a damping cavity 310, similar to that of FIG. 3A. As shown, the damping cavity 310 includes a porous plate 312, a deck plate 314, and a bladder 370, having an air tube 335 extending through the deck plate 314. As opposed to being filled with air, the bladder 370 is filled with lightweight and high-energy dissipation materials or foams to absorb impact. The foam can provide high-energy storage absorption, or can provide high-energy dissipation through internal friction. Alternatively, the bladder 370 may be filled with a combination of air or other gases, and high-energy dissipation materials or foams.

Figure 3C:
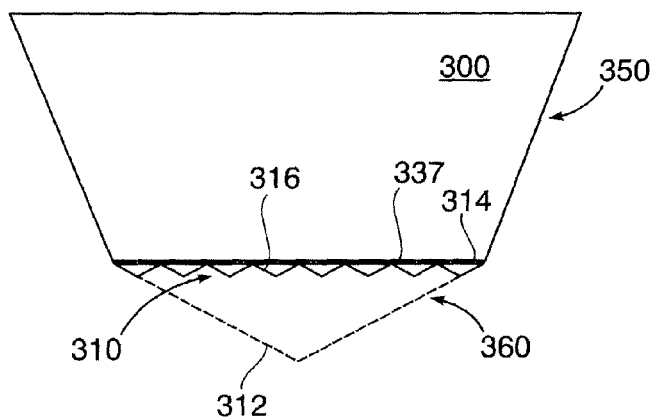
FIG. 3C is an exemplary front view illustration of a surface watercraft including a damping cavity, according to an embodiment of the invention.

FIG. 3C is an exemplary front view illustration of a surface watercraft 300 including a damping cavity 310, according to an embodiment of the invention. As shown, the damping cavity 310 includes a porous plate 312, and a deck plate 314. The damping cavity further includes a zigzag plate 316 attached to the wetted underside of the deck plate 314 within the cavity enclosure. The zigzag plate diffuses the impact onto the deck plate 314. Although a zigzag plate 316 is illustrated and outlined, other plates having irregular surface profiles may be attached to the deck plate for the dissipation of shock loads.

Figure 4:
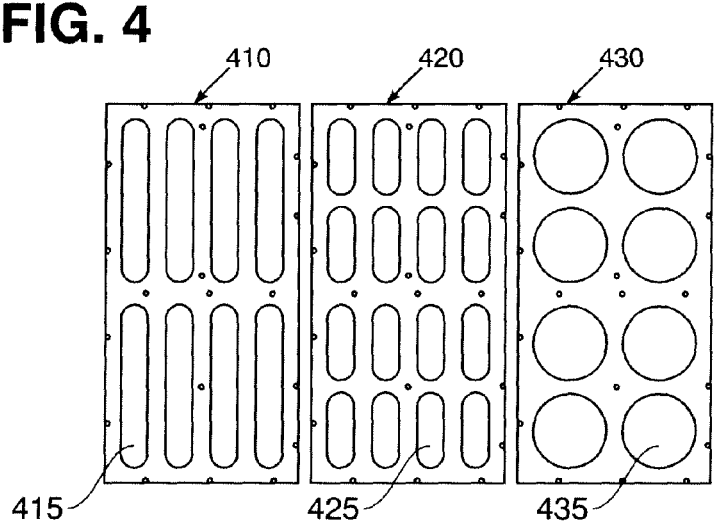
FIG. 4 is an exemplary schematic illustration of porous plate designs according embodiments of the invention.

FIG. 4 is an exemplary schematic illustration of porous plate designs 410, 420, and 430, according to embodiments of the invention. As shown, porous plate designs 410 and 420 have elongated holes 415 and 425 respectively. Porous plate design 430 has circular holes 435. The plate designs shown in FIG. 4 may be used in any of the above outlined damping cavities illustrated in FIGS. 1-3C. It should be noted that a porous plate design may include different combinations and arrangements of holes 415, 425, and 435, in which the positioning and the sizes of the holes may be varied. Additionally, porous plates having irregularly shaped holes or combinations of regular and irregularly shaped holes may also be used.

Figure 5A:
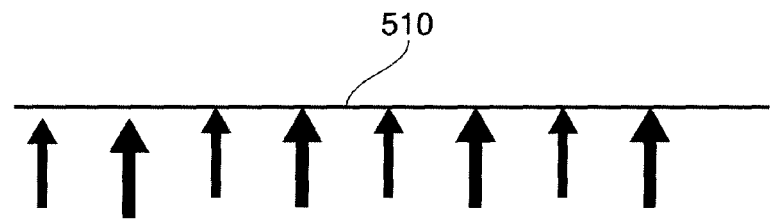
FIG. 5A is an explanatory illustration showing load impact on a rigid hull.
Figure 5B:
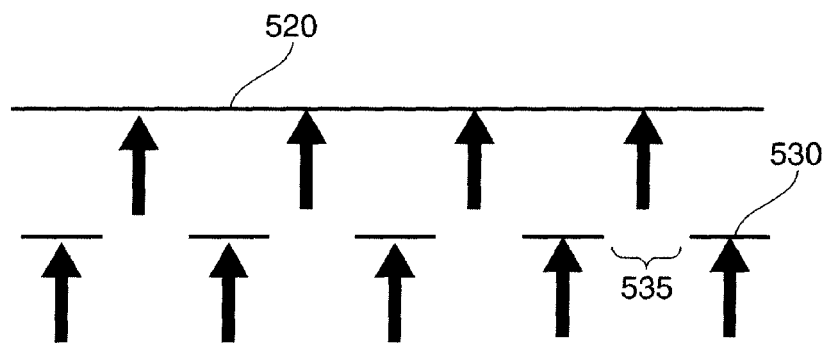
FIG. 5B is an explanatory illustration showing load impact on a damping cavity, according to embodiments of the invention.

In operation, the above outlined damping cavity significantly reduces the load impact on surface watercrafts and passengers in the crafts. FIGS. 5A and 5B are explanatory figures, with FIG. 5A showing the load impact on a rigid hull 510 in the absence of porous plates. The impacts of the waves on the hull are represented by arrows. FIG. 5B shows the a reduced load impact on a porous hull structure as provided by porous plates In FIG. 5B, the porous hull structure is essentially a damping cavity having a porous plate 530 and a deck plate 520, similar to the porous plate and deck plate shown in FIGS. 2A-3C. FIG. 5B further shows porous plate holes 535, which as outlined above, may be regular, irregular, or a combination thereof. The upward arrows in FIGS. 5A and 5B represent force vectors acting on the different surfaces. With respect to the load impact on a rigid hull structure, Vr denotes the wave impact velocity. The impact load F is an integration of surface pressure P(t) on the boat's rigid surface 510 and can be estimated by equation (1) as:

$$F = \int P(t)dA = k(1/2)\rho Vr^2 A \quad (1)$$

In equation (1), A denotes the rigid hull area 510 as shown in FIG. 5A. The dynamic coefficient k relates the dynamic pressure and the impact load. $\rho$ is the water density.

With respect to the hull including a porous plate 530 and a deck plate 520 with an empty space between the elements as shown in FIG. 5B, let the porous plate have a porosity of 50% as an example. Other porosity values may be used. The waves will first impact the porous surface 530. Note that the porous surface has a rigid area of 0.5 A. $F_1$ denotes the first impact load on the porous surface and is expressed by equation (2):

$$F_1 = k(1/2)\rho Vr^2 (0.5A) \quad (2)$$

The first impact load $F_1$ will be 50% of impact load F on the rigid hull 510, as shown in equation (3):

$$F_1 = 0.5F \quad (3)$$

The second wave impact will transmit to the deck plate 520 directly. As flow passes through the porous openings or holes, the flow will experience energy loss. Because of energy losses, the relative velocity impinging on the deck plate 510 is less than Vr, and may be denoted as Vr*. It should be noted that in damping cavity arrangements that include an inflatable bladder as shown in FIGS. 3A-3C, as the flow passes thorough the porous openings, the inflatable bladder causes the flow to undergo additional energy loss. Thus, in damping cavity arrangements as shown in FIGS. 3A-3C, there is also a Vr* value less than Vr because of energy absorption in the bladder 330 or foam 370. The second impact load $F_2$ on the plate can be expressed by equation (4):

$$F_2 = k(1/2)\rho Vr^{*2}(0.5A) < 0.5F \quad (4)$$

The sum of $F_1$ and F2 is less than F, as shown in equation (5):

$$F_1 + F_2 < F \quad (5)$$

Hence the impact load on the porous surface is less than the impact load on the rigid surface.

Another important mechanism of embodiments that do not include inflated bladders is the gap between the hull surface and the deck plate. The impact load $F_2$ will occur later than $F_1$, because $F_1$ and $F_2$ are not acting on the craft at the same time. The singular impact F that would occur with a rigid hull is split into two impacts separated by a time interval that prevents their summation to a single value. The net impact load can thus be greatly mitigated.

What has been described and illustrated herein are preferred embodiments of the invention along with some variations. The terms, descriptions and figures used herein are set forth by way of illustration only and are not meant as limitations. For example, although FIG. 4 illustrates only three different regular porous plate patterns, other porous plate patterns, including irregular patterns and combinations of regular and irregular patterns may be incorporated. Additionally, although the figures generally show one inflatable bladder per damping cavity, damping cavities may have a plurality of inflatable bladders. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A surface watercraft comprising a hull body, wherein said hull body comprises:
    an upper portion;
    a lower portion
    a forward end; and
    an aft end;
    a shock damping cavity within the hull body in said lower portion between said forward end and said aft end, said damping cavity comprising:
    a non-planar porous plate having a first edge and a second edge; and
    a deck plate having a first edge and a second edge, wherein said first edge of said deck plate is attached to said first edge of said non-planar porous plate and said second edge of said deck plate is attached to said second edge of said non-planar porous plate, thereby forming a cavity enclosure, wherein the hull body further comprises an undersurface comprising:
    a non-porous forward portion;
    a non-porous aft portion; and
    a porous portion between said non-porous forward portion and said non-porous aft portion, wherein said porous portion comprises said non-planar porous plate, said non-porous forward portion, said non-porous aft portion, and said porous portion meeting to form the undersurface, wherein in areas where the non-porous portions and said porous portions meet, said undersurface is substantially linear so that said porous portion is commensurate with the overall shape of the undersurface.

2. The surface watercraft of claim 1, wherein said non-planar porous plate comprises a substantially V-shaped cross section, and wherein said cavity enclosure comprises a substantially triangular cross section.

3. The surface watercraft of claim 2, wherein said damping cavity further comprises an air bladder within said cavity enclosure, and wherein said deck plate comprises a hole, wherein said air bladder comprises an air tube for supplying air or other gases to said bladder, said air tube extending from inside said cavity enclosure through said deck plate hole.

4. The surface watercraft of claim 3, wherein said bladder is filled with one or more pressurized gases, lightweight deformable materials, or a combination thereof.

5. The surface watercraft of claim 4, wherein a height from said deck plate to said non-planar porous plate is about 3 inches to about 4 inches, and wherein said hull has a length of about 30 feet to about 70 feet.

6. The surface watercraft of claim 5, wherein said porous plate has a porous surface configuration, wherein said porous surface configuration comprises circular holes, elongated holes, or combinations thereof.

7. The surface watercraft of claim 1, wherein said damping cavity further comprises a zigzag plate having a non-planar zigzag surface, said zigzag plate attached to said deck plate within said cavity enclosure.

8. The surface watercraft of claim 7, wherein said non-planar porous plate comprises a substantially V-shaped cross section, and wherein said cavity enclosure comprises a substantially triangular cross section.

9. A shock mitigating high speed surface watercraft comprising:
  a hull having a forward end, an aft end, and an exposed undersurface, said exposed undersurface comprising:
    a wet region extending from the aft end of the hull defining the region of the hull that supports the watercraft when said high speed watercraft is traveling at a planing mode velocity; and
    a dry region extending from the forward end of the hull towards the wet region defining the region of the hull that is above a water level when said high speed watercraft is traveling at said planing mode velocity;
  a damping cavity comprising:
    a non-planar porous plate forming a part of said exposed undersurface and positioned in said dry region of said exposed undersurface, said non-planar porous plate having a first longitudinal edge and a second longitudinal edge; and
    a deck plate within said hull having a first longitudinal edge and a second longitudinal edge, wherein said first longitudinal edge of said deck plate is attached to said first longitudinal edge of said non-planar porous plate and said second longitudinal edge of said deck plate is attached to said second longitudinal edge of said non-planar porous plate, thereby forming a cavity enclosure within said hull, wherein said undersurface further comprises a non-porous forward portion in said dry region, a non-porous aft portion in said wet region, wherein said non-planar porous plate is between the non-porous forward portion and the non-porous aft portion.

10. The surface watercraft of claim 9, wherein said non-planar porous plate comprises a substantially V-shaped cross section, and wherein said cavity enclosure within said hull comprises a substantially triangular cross section.

11. The surface watercraft of claim 9, wherein said damping cavity further comprises an air bladder within said cavity enclosure, and wherein said deck plate comprises a hole, wherein said air bladder comprises an air tube for supplying air or other gases to said bladder, said air tube extending from inside said cavity enclosure through said deck plate hole.

12. The surface watercraft of claim 11, wherein said bladder is filled with one or more pressurized gases, lightweight deformable materials, or a combination thereof.

13. The surface watercraft of claim 12, wherein a height from said deck plate to said non-planar porous plate is about 3 inches to about 4 inches, and wherein said hull has a length of about 30 feet to about 70 feet.

14. The surface watercraft of claim 13, wherein said damping cavity has a length that is about 20% to about 45% of said hull length, and wherein said damping cavity is located between a forward end of said hull and a rear end of said hull.

15. The surface watercraft of claim 14, wherein said porous plate has a porous surface configuration, wherein said porous surface configuration comprises circular holes, elongated holes, or combinations thereof.

16. The surface watercraft of claim 15, wherein said bladder is pressurized and positioned within said cavity enclosure to seal said holes of said porous plate, maintaining a substantially smooth surface on said porous plate.

17. The surface watercraft of claim 16, wherein said planing mode velocity of said watercraft is about 35 knots to about 55 knots.

18. The surface watercraft of claim 9, wherein said damping cavity further comprises a zigzag plate having a non-planar zigzag surface, said zigzag plate attached to said deck plate within said cavity enclosure.

19. The surface watercraft of claim 18, wherein a height from said deck plate to said non-planar porous plate is about 3 inches to about 4 inches, and wherein said hull has a length of about 30 feet to about 70 feet.

* * * * *